United States Patent
Kanamori et al.

(10) Patent No.: US 8,576,280 B2
(45) Date of Patent: Nov. 5, 2013

(54) IMAGE MEASURING APPARATUS

(75) Inventors: Hiroyuki Kanamori, Tsukuba (JP); Takeshi Saeki, Kawasaki (JP); Hirato Sonobe, Miyazaki (JP)

(73) Assignee: Mitutoyo Corporation, Kawasaki (JP)

( * ) Notice: Subject to any disclaimer, the term of this patent is extended or adjusted under 35 U.S.C. 154(b) by 520 days.

(21) Appl. No.: 12/850,215

(22) Filed: Aug. 4, 2010

(65) Prior Publication Data
US 2011/0032351 A1 Feb. 10, 2011

(30) Foreign Application Priority Data
Aug. 6, 2009 (JP) .................................. 2009-183321

(51) Int. Cl.
*H04N 7/18* (2006.01)
*G01B 11/28* (2006.01)

(52) U.S. Cl.
USPC ......................................... 348/142; 356/630

(58) Field of Classification Search
USPC ......................................... 348/142; 356/630
See application file for complete search history.

(56) References Cited

U.S. PATENT DOCUMENTS

| | | | | |
|---|---|---|---|---|
| 4,284,335 A * | 8/1981 | Takemae et al. | ............... | 396/103 |
| 4,286,850 A * | 9/1981 | Aoki | ............................... | 396/127 |
| 4,477,923 A * | 10/1984 | Baumann et al. | ................ | 378/95 |
| 4,497,065 A * | 1/1985 | Tisdale et al. | ................ | 382/103 |
| 4,600,830 A * | 7/1986 | Tokutomi et al. | .......... | 250/201.2 |
| 4,891,529 A * | 1/1990 | Braun et al. | ............. | 250/559.19 |
| 4,982,219 A * | 1/1991 | Uchiyama | ....................... | 396/91 |
| 5,170,202 A * | 12/1992 | Bell | ................................ | 396/80 |
| 5,404,163 A * | 4/1995 | Kubo | ............................ | 348/142 |
| 5,506,654 A * | 4/1996 | Kim | ............................... | 396/147 |
| 5,568,270 A * | 10/1996 | Endo | ............................. | 358/475 |
| 5,594,768 A * | 1/1997 | Fujii et al. | ....................... | 378/21 |
| 5,694,632 A * | 12/1997 | Capper | ........................... | 396/431 |
| 5,710,662 A * | 1/1998 | Nishida | ......................... | 359/368 |
| 5,966,550 A * | 10/1999 | Oono et al. | ....................... | 396/82 |
| 6,055,041 A * | 4/2000 | Matsumoto et al. | .......... | 356/3.08 |
| 6,094,537 A * | 7/2000 | Okazaki et al. | ............... | 396/127 |
| 6,115,552 A * | 9/2000 | Kaneda | ........................... | 396/82 |
| 6,433,859 B1 * | 8/2002 | Nakata | ......................... | 356/3.14 |
| 6,452,686 B1 * | 9/2002 | Svetkoff et al. | ................ | 356/602 |
| 6,470,149 B1 * | 10/2002 | Nakahara et al. | ................ | 396/89 |
| 2002/0025154 A1 * | 2/2002 | Nonaka | ........................... | 396/106 |
| 2002/0140957 A1 * | 10/2002 | Matama | ......................... | 358/1.9 |

(Continued)

FOREIGN PATENT DOCUMENTS

| | | |
|---|---|---|
| EP | 1 729 194 | 12/2006 |
| EP | 1729194 A2 * | 12/2006 |
| JP | 2006-337275 | 12/2006 |

*Primary Examiner* — Sath V Perungavoor
*Assistant Examiner* — Peter D Le
(74) *Attorney, Agent, or Firm* — Rankin, Hill & Clark LLP (57) ABSTRACT

An image measuring apparatus includes a strobe illumination unit, a camera, a movement mechanism, and a controller. The controller includes a focus position detector that detects the focus position of the camera by controlling the movement mechanism to move the camera along the optical axis of the camera at a predetermined velocity and by controlling the camera to pick up an image of a measurement target object at plural positions. The focus position detector includes an illumination control unit that controls the lighting time of the strobe illumination unit, thereby controlling the brightness of illumination, a relative position acquisition unit that acquires the position of the camera at the center of the lighting time, and a contrast detection unit that detects the contrast of the image picked up by the camera.

10 Claims, 11 Drawing Sheets

(56) References Cited

U.S. PATENT DOCUMENTS

| | | | |
|---|---|---|---|
| 2002/0149689 A1* | 10/2002 | Sannoh et al. | 348/333.02 |
| 2003/0081137 A1* | 5/2003 | Yamazaki | 348/354 |
| 2003/0184855 A1* | 10/2003 | Yasuda et al. | 359/383 |
| 2004/0263672 A1* | 12/2004 | Yoshida | 348/345 |
| 2006/0227227 A1* | 10/2006 | Tsuruoka | 348/241 |
| 2007/0071433 A1* | 3/2007 | Kawanami | 396/127 |
| 2009/0284759 A1 | 11/2009 | Yoshiki | |

* cited by examiner

IMAGE MEASURING APPARATUS

TECHNICAL FIELD

The present invention generally relates to an image measuring apparatus. In particular, the invention relates to an image measuring apparatus that is equipped with a strobe illumination unit.

BACKGROUND

An image measuring apparatus generally includes a strobe illumination unit that illuminates a measurement target object with light, an image pickup unit that picks up an image of the measurement target object, a movement mechanism that moves the image pickup unit and/or the measurement target object relative to each other, and a control unit that controls the strobe illumination unit, the image pickup unit, and the movement mechanism to measure the measurement target object on the basis of the image picked up by the image pickup unit. An example of such an image measuring apparatus is disclosed in Japanese Unexamined Patent Application Publication No. 2006-337275. The image measuring apparatus disclosed in the above patent document includes an illumination device (strobe illumination unit), a CCD camera (image pickup unit), an XYZ driving mechanism (movement mechanism), and a computer system (control unit). The disclosed image measuring apparatus measures a measurement target object on the basis of an image picked up by the CCD camera.

In an image measuring apparatus that includes a strobe illumination unit as disclosed in the above patent document, the strobe illumination unit can adjust the brightness of illumination through the control of its lighting time. Therefore, in comparison with an illumination unit that is continuously in a light-up state, the strobe illumination unit enables the brightness of illumination to be adjusted more easily. Therefore, it is possible to decrease the variability in the brightness of illumination, which could vary from one image measuring apparatus to another. Thus, it is possible to decrease variation in the result of measurement.

An image measuring apparatus such as the disclosed apparatus measures a measurement target object after performing automatic focus processing. The automatic focus processing is processing for automatically positioning an image pickup unit at the position of the focus of a measurement target object.

Figure 9A:
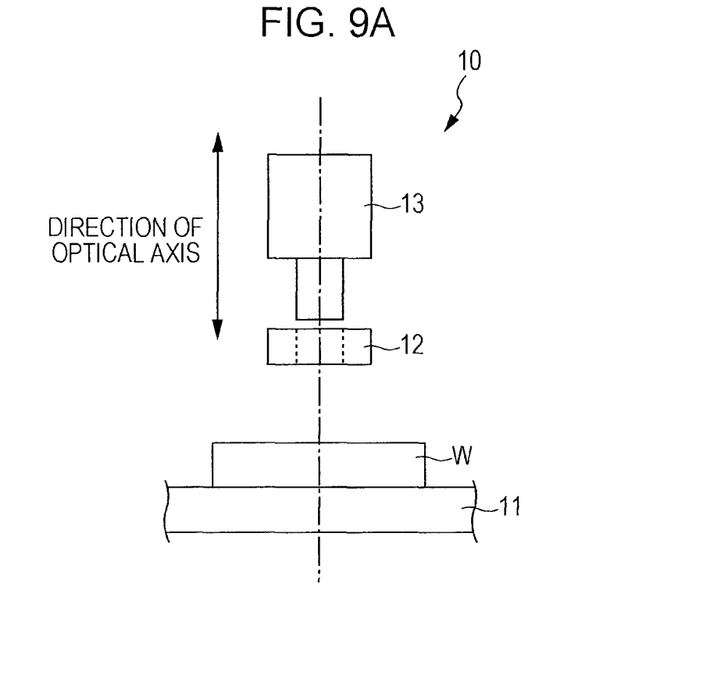
FIG. 9A is a diagram that illustrates a state in which an image measuring apparatus performs automatic focus processing.
Figure 9B:
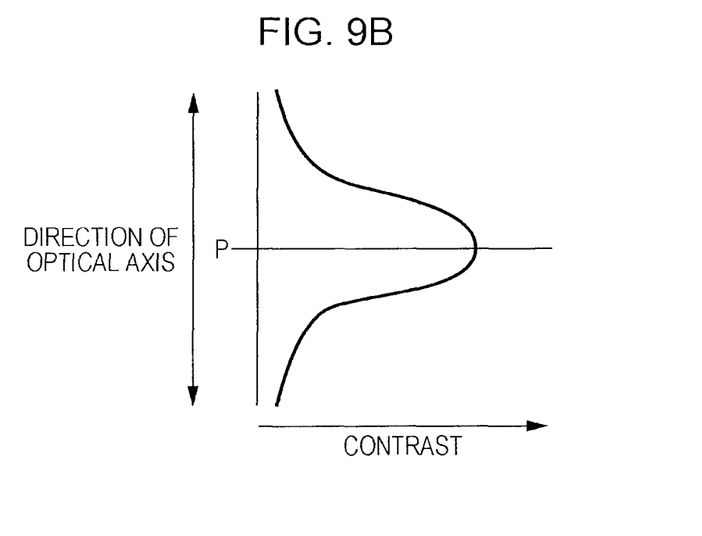
FIG. 9B is a graph that shows the contrast of an image of a measurement target object picked up by the image measuring apparatus illustrated in FIG. 9A during automatic focus processing.

FIG. 9A is a diagram that illustrates a state in which an image measuring apparatus 10 performs automatic focus processing. As illustrated in FIG. 9A, the image measuring apparatus 10 includes a table 11 on which a measurement target object W is placed, a strobe illumination unit 12 that illuminates the measurement target object W with light, an image pickup unit 13 that picks up an image of the measurement target object W, a movement mechanism (not illustrated in the drawing) that moves the image pickup unit 13 in the direction of the optical axis of the image pickup unit 13 (i.e., direction shown by a double headed arrow in FIG. 9), and a control unit (not shown) that controls the entire operation of the image measuring apparatus 10. When the image measuring apparatus 10 performs automatic focus processing, the control unit controls the movement mechanism to move the image pickup unit 13 in the direction of the optical axis of the image pickup unit 13 at a predetermined velocity and controls the image pickup unit 13 to pick up an image of the measurement target object W at a plurality of positions. By this means, the image measuring apparatus 10 detects the position of the focus of the image pickup unit 13. Specifically, as illustrated in FIG. 9B, the image measuring apparatus 10 detects the contrast of an image picked up by the image pickup unit 13 and detects a position P that corresponds to an image that maximizes the contrast as the focus position.

However, unlike an image measuring apparatus that is equipped with an illumination unit that is continuously in a light-up state, the image measuring apparatus 10, which is equipped with the strobe illumination unit 12, has a problem in that it is difficult to detect the focus position properly by performing the above automatic focus processing.

Figure 10:
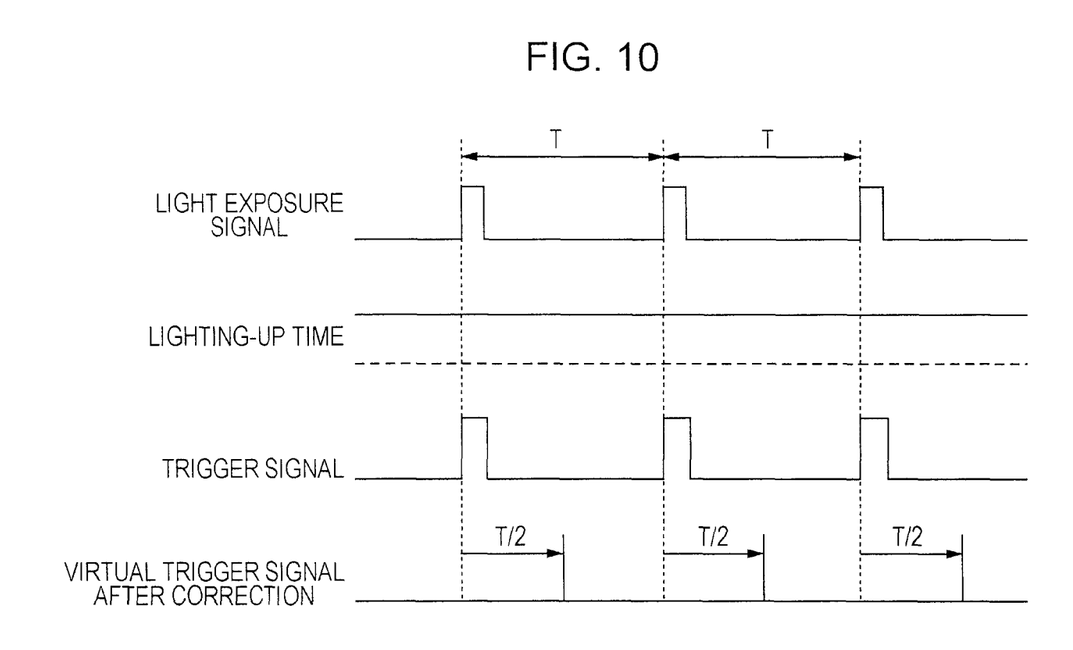
FIG. 10 is a diagram that shows the timing diagram of automatic focus processing performed by an image measuring apparatus that is equipped with an illumination unit that is continuously in a light-up state.

FIG. 10 is a diagram that shows the timing diagram of automatic focus processing performed by an image measuring apparatus that is equipped with an illumination unit that is continuously in a light-up state. In FIG. 10, the first part of the chart from the top shows an exposure signal that is outputted from an image pickup unit when the operation of picking up an image of a measurement target object is started. The second part of the chart from the top shows the lighting time of the illumination unit. The third part of the chart from the top shows a trigger signal used for acquiring the position of the image pickup unit by a control unit. The fourth part of the chart from the top shows a virtual trigger signal that corresponds to the compensated position of the image pickup unit (i.e., position after compensation) when compensation processing is performed on the position of the image pickup unit that is acquired by the control unit.

As illustrated in FIG. 10, the image pickup unit starts to pick up an image of a measurement target object at predetermined intervals. When starting the image pickup operation, the image pickup unit transmits an exposure signal to the control unit. Receiving the exposure signal, the control unit generates a trigger signal that is in synchronization with the exposure signal. The control unit acquires the position of the image pickup unit on the basis of the trigger signal. Since the illumination unit is continuously in a light-up state, the brightness of illumination during exposure time T, which is time from the start of image pickup operation to the end thereof, is constant. Therefore, the image picked up by the image pickup unit is a superimposed image in the exposure time T. Thus, it is desirable to acquire the position of the image pickup unit at the center of the exposure time T.

However, since the image pickup unit is moving at a predetermined velocity, if the control unit acquires the position of the image pickup unit on the basis of the trigger signal, it is impossible to acquire the position of the image pickup unit at the center of the exposure time T. Therefore, the control unit compensates the position of the image pickup unit acquired on the basis of the trigger signal into the position of the image pickup unit at the center of the exposure time T on the basis of the velocity of the movement of the image pickup unit and the exposure time T. Thus, a virtual trigger signal that corresponds to the compensated position of the image pickup unit falls behind the trigger signal by delay amount of T/2.

Figure 11:
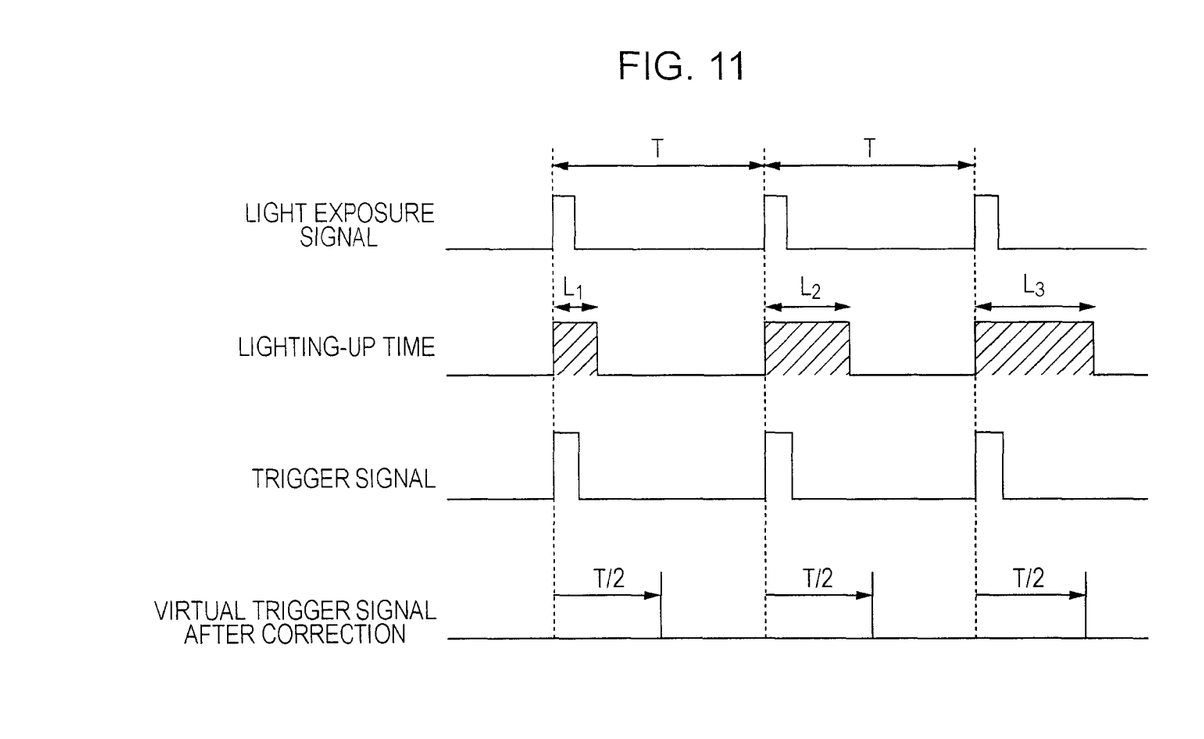
FIG. 11 is a diagram that shows the timing diagram of automatic focus processing performed by an image measuring apparatus that is equipped with a strobe illumination unit.

FIG. 11 is a diagram that shows the timing diagram of automatic focus processing performed by the image measuring apparatus 10, which is equipped with the strobe illumination unit 12. The first, third, and fourth parts of the chart from the top in FIG. 11 are the same as those in FIG. 10. The second part of the chart from the top in FIG. 11 shows the lighting time ($L_1$, $L_2$, and $L_3$) of the strobe illumination unit 12. In the operation of the strobe illumination unit 12, as illustrated in FIG. 11, a control unit controls the lighting time $L_1$, $L_2$, and $L_3$. Accordingly, unlike an illumination unit that is continuously in a light-up state, the brightness of illumination during the exposure time T is not always constant. Therefore, the image picked up by the image pickup unit 13 is a superimposed image in the lighting time $L_1$, $L_2$, and $L_3$. Thus, it is desirable to acquire the position of the image pickup unit 13 at the center of the lighting time $L_1$, $L_2$, and $L_3$. However, the image measuring apparatus 10, which is equipped with the strobe illumination unit 12, cannot acquire the position of the image pickup unit 13 at the center of the lighting time $L_1$, $L_2$, and $L_3$ even when it performs the same compensation as that performed by an image measuring apparatus that is equipped with an illumination unit that is continuously in a light-up state. For this reason, there is a problem in that it is difficult to detect a focus position properly.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An advantage of some aspects of the invention is to provide an image measuring apparatus that is capable of detecting a focus position properly by performing automatic focus processing.

An image measuring apparatus according to an aspect of the invention has the following features. The image measuring apparatus includes a strobe illumination unit, an image pickup unit, a movement mechanism, and a control unit. The strobe illumination unit illuminates a measurement target object with light. The image pickup unit picks up an image of the measurement target object. The movement mechanism moves the image pickup unit, the measurement target object, or combinations thereof relative to each other. The control unit controls the strobe illumination unit, the image pickup unit, and the movement mechanism to measure the measurement target object on the basis of the image picked up by the image pickup unit. The control unit includes a focus position detector that detects a focus position of the image pickup unit by controlling the movement mechanism to change a positional relationship between the image pickup unit and the measurement target object along an optical axis of the image pickup unit at a predetermined movement velocity and by controlling the image pickup unit to pick up the image of the measurement target object at a plurality of relative positions. The focus position detector includes an illumination controlling section, a relative position acquiring section, and a contrast detecting section. The illumination controlling section controls brightness of illumination used for picking up the image of the measurement target object at the image pickup unit by controlling lighting time of the strobe illumination unit. The relative position acquiring section acquires each of the relative positions at the center of the lighting time. The contrast detecting section detects contrast of the image picked up by the image pickup unit. Among the relative positions acquired by the relative position acquiring section, the focus position detector selectively detects one relative position that corresponds to an image that maximizes the contrast detected by the contrast detecting section as the focus position.

As stated above, the control unit includes the focus position detector, which performs automatic focus processing. The focus position detector includes the illumination controlling section that controls the lighting time of the strobe illumination unit, the relative position acquiring section that acquires the relative positions of the image pickup unit and the measurement target object, and the contrast detecting section that detects the contrast of the image picked up by the image pickup unit. The relative position acquiring section acquires each of the relative positions of the image pickup unit and the measurement target object at the center of the lighting time. Therefore, the image measuring apparatus can detect the focus position properly by performing automatic focus processing.

In an image measuring apparatus according to the above aspect of the invention, preferably, the illumination controlling section can start lighting of the strobe illumination unit by receiving a predetermined signal transmitted to the control unit; and the relative position acquiring section can acquire each of the relative positions by receiving the predetermined signal and thereafter correct the relative position on the basis of the lighting time and the predetermined movement velocity.

With such a preferred configuration, since the relative position acquiring section compensates the relative position of the image pickup unit and the measurement target object that is acquired by receiving the predetermined signal transmitted to the control unit on the basis of the lighting time of the strobe illumination unit and the movement velocity in the relative position of the image pickup unit and the measurement target object, it is possible to acquire the relative position of the image pickup unit and the measurement target object at the center of the lighting time. Therefore, the image measuring apparatus can detect the focus position properly by performing automatic focus processing.

In an image measuring apparatus according to the above aspect of the invention, preferably, on the basis of a predetermined signal transmitted to the control unit and exposure time of the image pickup unit, the illumination controlling section can control the lighting time in such a manner that the center of the lighting time is the same point in time as the center of the exposure time; and the relative position acquiring section can acquire each of the relative positions by receiving the predetermined signal and thereafter correct the relative position on the basis of the exposure time and the predetermined movement velocity.

With such a preferred configuration, since the illumination controlling section controls the lighting time in such a manner that the center of the lighting time is the same point in time as the center of the exposure time of the image pickup unit on the basis of the predetermined signal transmitted to the control unit and the exposure time, compensation is performed in the same manner as done in an image measuring apparatus that is equipped with an illumination unit that is continuously in a light-up state. By this means, the relative position acquiring section can acquire the relative position of the image pickup unit and the measurement target object at the center of the lighting time. Therefore, the image measuring apparatus can detect the focus position properly by performing automatic focus processing.

In an image measuring apparatus according to the above aspect of the invention, preferably, on the basis of a predetermined signal transmitted to the control unit and exposure time of the image pickup unit, the illumination controlling section can control the lighting time in such a manner that the center of the lighting time is the same point in time as the center of the exposure time; and the relative position acquiring section can acquire each of the relative positions on the basis of the predetermined signal and the exposure time.

With such a preferred configuration, the relative position acquiring section can acquire the relative position of the image pickup unit and the measurement target object at the center of the lighting time without performing compensation.

Therefore, the image measuring apparatus can detect the focus position properly by performing automatic focus processing.

It is preferable that the predetermined signal is an exposure signal that is transmitted from the image pickup unit to the control unit when the image pickup unit starts to pick up the image of the measurement target object.

With such a preferred configuration, the relative position acquiring section can acquire the relative position of the image pickup unit and the measurement target object at the center of the lighting time by utilizing the exposure signal. Therefore, the image measuring apparatus can detect the focus position properly by performing automatic focus processing without any need to provide an additional device.

It is preferable that the predetermined signal is an external signal that is transmitted, to the control unit, from a signal source that is connected to the image measuring apparatus.

With such a preferred configuration, the relative position acquiring section can acquire the relative position of the image pickup unit and the measurement target object at the center of the lighting time by utilizing the external signal transmitted from the signal source. Therefore, the image measuring apparatus can detect the focus position properly by performing automatic focus processing.

To the accomplishment of the foregoing and related ends, the invention, then, involves the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

First Embodiment

Figure 1:
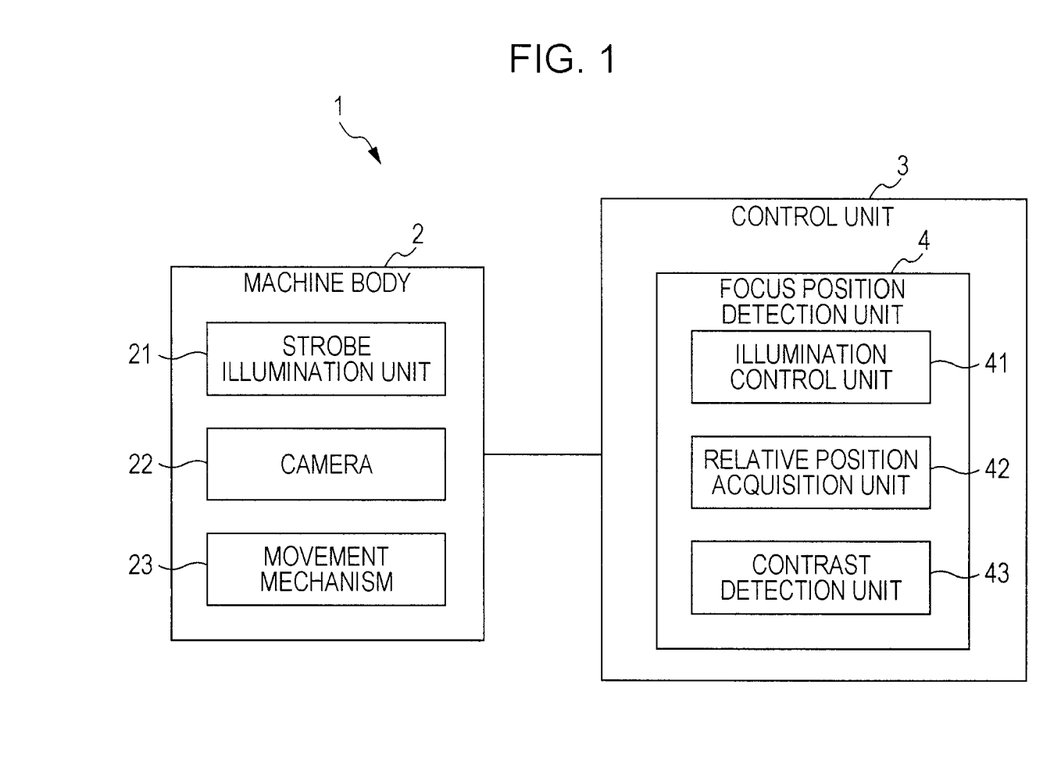
FIG. 1 is a block diagram that schematically illustrates an example of the configuration of an image measuring apparatus according to a first embodiment of the invention.

With reference to the accompanying drawings, a first embodiment of the present invention will now be explained in detail. FIG. 1 is a block diagram that schematically illustrates an example of the configuration of an image measuring apparatus 1 according to the first embodiment of the invention. As illustrated in FIG. 1, the image measuring apparatus 1 includes a machine body 2 and a control unit 3 that controls the machine body 2. The machine body 2 includes the same components as those of the image measuring apparatus 10 as explained earlier in connection with FIG. 9A. Specifically, the machine body 2 includes a strobe illumination unit 21 that illuminates a measurement target object W (not shown) with light, a camera (image pickup unit) 22 that picks up an image of the measurement target object W, and a movement mechanism 23 that moves the camera 22 in the direction of the optical axis of the camera 22. In the present embodiment of the invention, the movement mechanism 23 moves the camera 22 to position the camera 22 and the measurement target object W relative to each other.

The control unit 3 controls the machine body 2 to measure the measurement target object W on the basis of an image picked up by the camera 22. The following explanation of the present embodiment of the invention focuses on a function for performing automatic focus processing among various functions of the control unit 3. The control unit 3 includes a focus position detection unit 4 that detects the position of the focus of the camera 22. The focus position detection unit 4 detects the focus position by controlling the movement mechanism 23 to move the camera 22 in the direction of the optical axis of the camera 22 at a predetermined velocity and by controlling the camera 22 to pick up an image of the measurement target object W at a plurality of positions.

The focus position detection unit 4 includes an illumination control unit 41, a relative position acquisition unit 42, and a contrast detection unit 43. The illumination control unit 41 controls the lighting time of the strobe illumination unit 21, thereby controlling the brightness of illuminating light used for picking up an image of the measurement target object W at the camera 22. The relative position acquisition unit 42 acquires the position of the camera 22 so as to determine (i.e., acquire) the relative positions of the camera 22 and the measurement target object W. The contrast detection unit 43 detects the contrast of an image picked up by the camera 22. Among the positions of the camera 22 acquired by the relative position acquisition unit 42, the focus position detection unit 4 selectively detects a position that corresponds to an image that maximizes contrast detected by the contrast detection unit 43 as the focus position.

Figure 2:
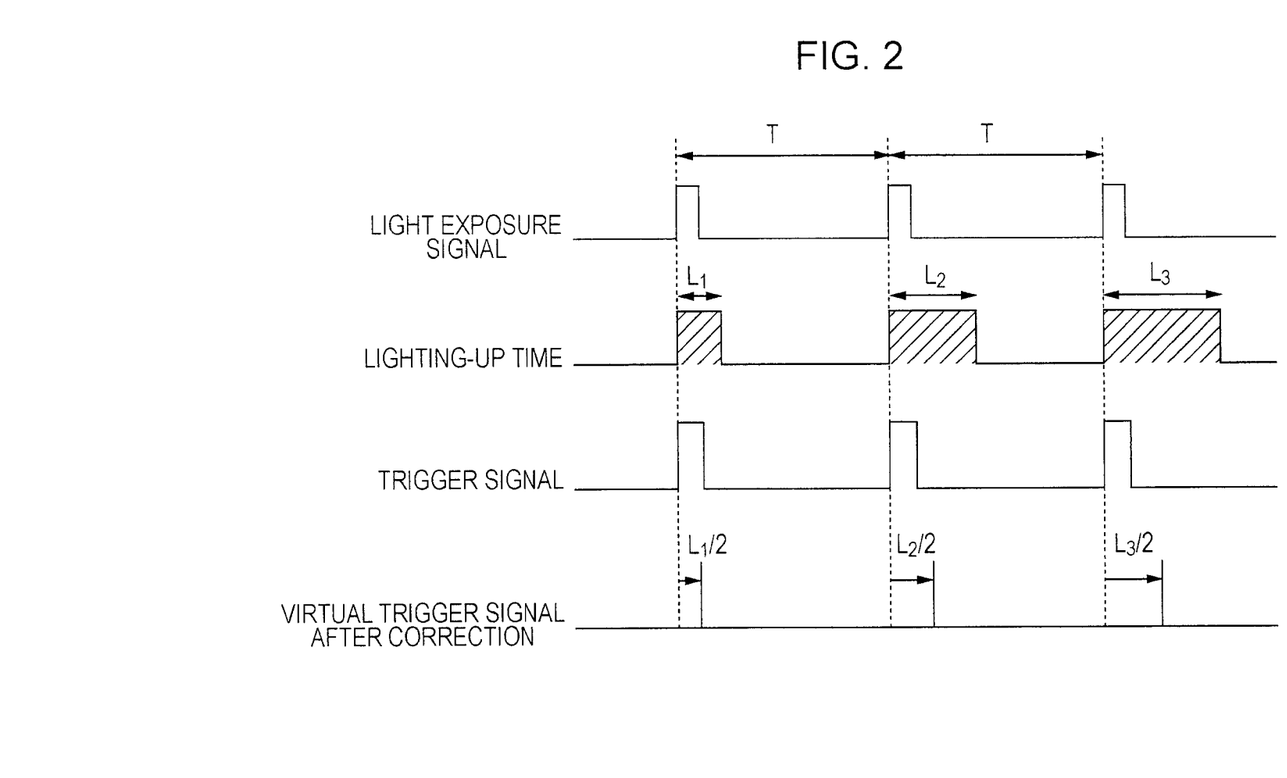
FIG. 2 is a diagram that shows the timing diagram of automatic focus processing performed by an image measuring apparatus according to the first embodiment of the invention.

FIG. 2 is a diagram that shows the timing diagram of automatic focus processing performed by the image measuring apparatus 1. In FIG. 2, the first part of the chart from the top shows an exposure signal that is outputted from the camera 22 when the operation of picking up an image of the measurement target object W is started. The second part of the chart from the top shows the lighting time of the strobe illumination unit 21. The third part of the chart from the top shows a trigger signal used for acquiring the position of the camera 22 by the relative position acquisition unit 42. The fourth part of the chart from the top shows a virtual trigger signal that corresponds to the compensated position of the camera 22 when compensation processing is performed on the position of the camera 22 that is acquired by the relative position acquisition unit 42.

As illustrated in FIG. 2, the camera 22 starts to pick up an image of the measurement target object W at predetermined intervals. When starting the image pickup operation, the camera 22 transmits an exposure signal to the control unit 3. The illumination control unit 41 starts the lighting operation of the strobe illumination unit 21 by receiving the exposure signal transmitted to the control unit 3. The illumination control unit 41 controls lighting time $L_1$, $L_2$, and $L_3$. Upon the reception of the exposure signal transmitted to the control unit 3, the relative position acquisition unit 42 generates a trigger signal that is in synchronization with the exposure signal. The relative position acquisition unit 42 acquires the position of the camera 22 on the basis of the trigger signal. After the acquisition of the position of the camera 22 on the basis of the trigger signal, the relative position acquisition unit 42 compensates the position of the camera 22 on the basis of the lighting time $L_1$, $L_2$, and $L_3$ and movement velocity in the position of the camera 22, thereby acquiring the position of the camera 22 at the center of the lighting time $L_1$, $L_2$, and $L_3$. Therefore, the virtual trigger signal that corresponds to the compensated position of the camera 22 falls behind the trigger signal by a delay amount of time $L_1/2$, $L_2/2$, or $L_3/2$.

The image measuring apparatus 1 according to the present embodiment of the invention can demonstrate one or more of the following operating effects and can offer one or more of the following advantages.

(1) The control unit 3 includes the focus position detection unit 4 that performs automatic focus processing. The focus position detection unit 4 includes the illumination control unit 41 that controls the lighting time of the strobe illumination unit 21, the relative position acquisition unit 42 that acquires the position of the camera 22, and the contrast detection unit 43 that detects the contrast of an image picked up by the camera 22. The relative position acquisition unit 42 acquires the position of the camera 22 at the center of the lighting time. Therefore, the image measuring apparatus 1 can detect a focus position properly by performing automatic focus processing.

(2) The relative position acquisition unit 42 compensates the position of the camera 22 that is acquired by receiving an exposure signal transmitted to the control unit 3. The compensation is performed on the basis of the lighting time of the strobe illumination unit 21 and the movement velocity in the position of the camera 22. Therefore, it is possible to acquire the position of the camera 22 at the center of the lighting time.

(3) The relative position acquisition unit 42 can acquire the position of the camera 22 at the center of the lighting time by utilizing the exposure signal. Therefore, the image measuring apparatus 1 can detect a focus position properly by performing automatic focus processing without any need to provide an additional device.

Second Embodiment

Figure 3:
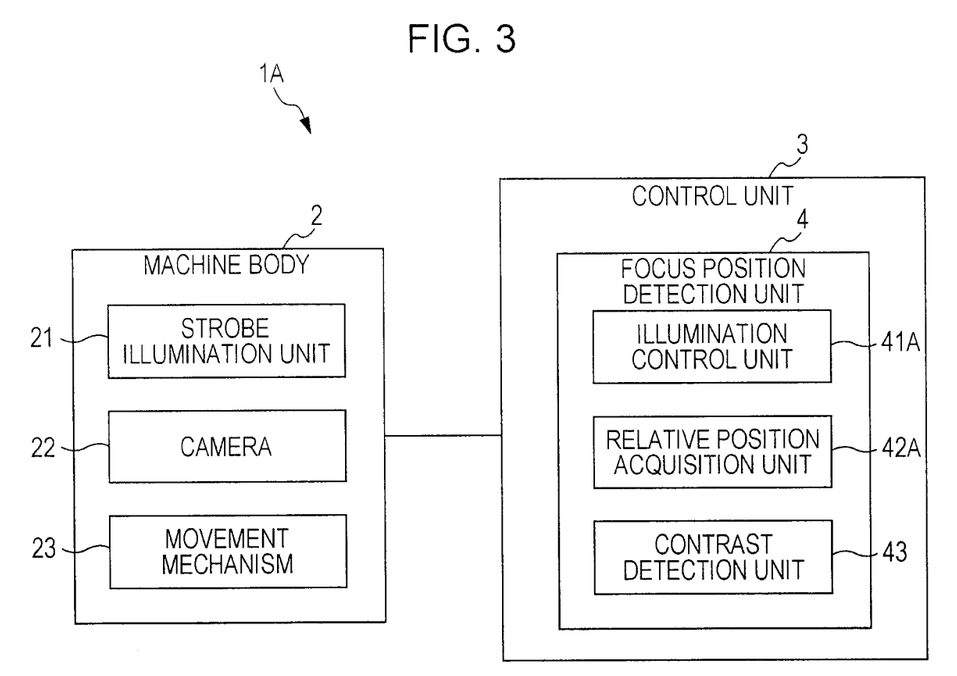
FIG. 3 is a block diagram that schematically illustrates an example of the configuration of an image measuring apparatus according to a second embodiment of the invention.
Figure 4:
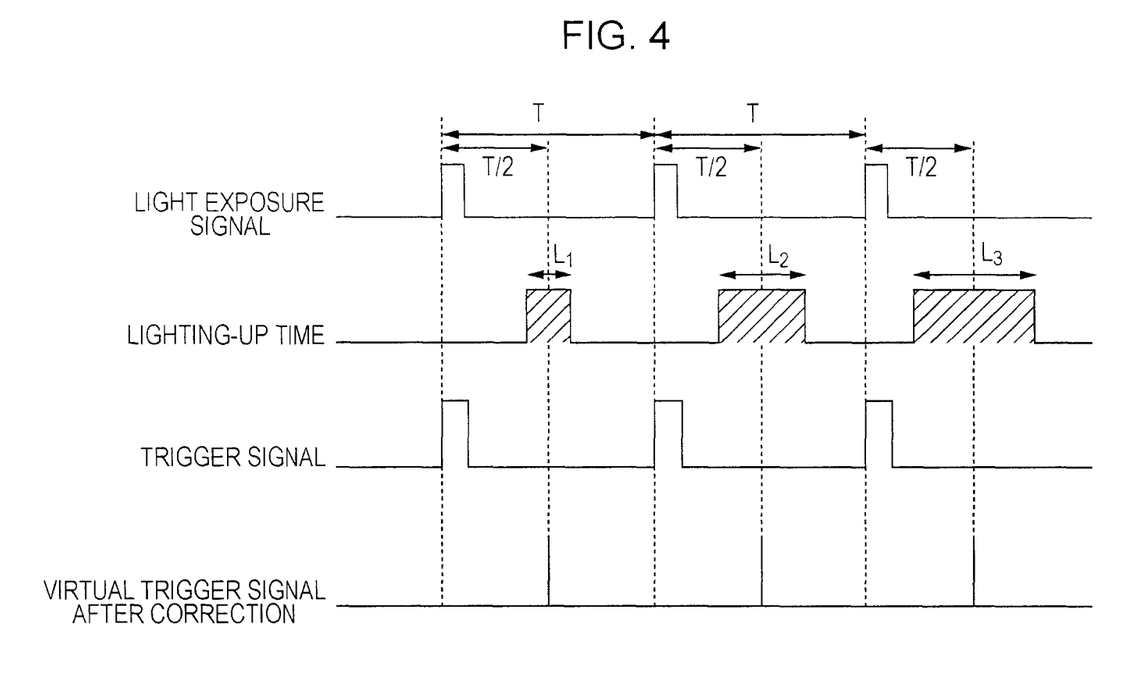
FIG. 4 is a diagram that shows the timing diagram of automatic focus processing performed by an image measuring apparatus according to the second embodiment of the invention.

With reference to the accompanying drawings, a second embodiment of the present invention will now be explained in detail. FIG. 3 is a block diagram that schematically illustrates an example of the configuration of an image measuring apparatus 1A according to the second embodiment of the invention. FIG. 4 is a diagram that shows the timing diagram of automatic focus processing performed by the image measuring apparatus 1A. In the following description, the same reference numerals are used for the components described above to omit explanation.

As explained above, the image measuring apparatus 1 according to the first embodiment of the invention includes the illumination control unit 41 and the relative position acquisition unit 42. The illumination control unit 41 starts the lighting operation of the strobe illumination unit 21 when the control unit 3 receives the exposure signal transmitted thereto. The relative position acquisition unit 42 compensates the position of the camera 22 on the basis of the lighting time $L_1$, $L_2$, and $L_3$ and the movement velocity in the position of the camera 22. The image measuring apparatus 1A according to the second embodiment of the invention includes an illumination control unit 41A and a relative position acquisition unit 42A as illustrated in FIG. 3. The image measuring apparatus 1A has the following differences from the image measuring apparatus 1. As illustrated in FIG. 4, the illumination control unit 41A controls the lighting time $L_1$, $L_2$, and $L_3$ in such a manner that the center of the lighting time $L_1$, $L_2$, and $L_3$ is the same point in time as the center of exposure time T of the camera 22 on the basis of the exposure signal transmitted to the control unit 3 and the exposure time T. The relative position acquisition unit 42A compensates the position of the camera 22 on the basis of the exposure time T and the movement velocity in the position of the camera 22.

The present embodiment of the invention can demonstrate one or more of the same operating effects and can offer one or more of the same advantages as those described in (1) and (3) of the foregoing embodiment of the invention. In addition, in some instances, one or more of the following operating effects and advantages can be expected.

(4) Since the illumination control unit 41A controls the lighting time $L_1$, $L_2$, and $L_3$ in such a manner that the center of the lighting time $L_1$, $L_2$, and $L_3$ is the same point in time as the center of exposure time T of the camera 22 on the basis of the exposure signal transmitted to the control unit 3 and the exposure time T, compensation is performed in the same manner as done in an image measuring apparatus that is equipped with an illumination unit that is continuously in a light-up state. By this means, the relative position acquisition unit 42 can acquire the position of the camera 22 at the center of the lighting time $L_1$, $L_2$, and $L_3$. Therefore, the image measuring apparatus 1A can detect a focus position properly by performing automatic focus processing.

Third Embodiment

Figure 5:
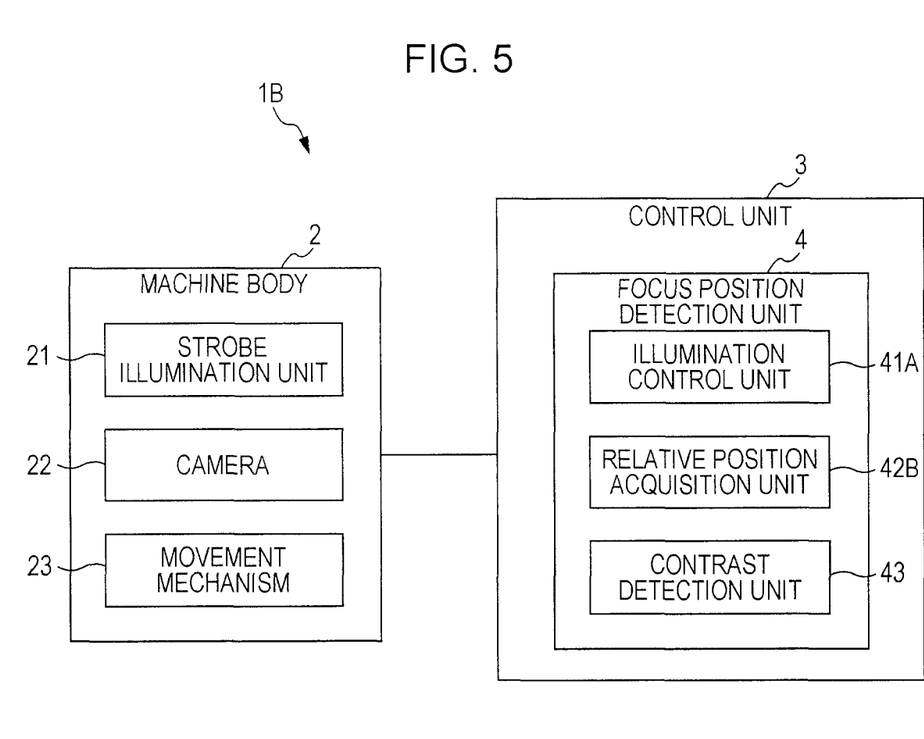
FIG. 5 is a block diagram that schematically illustrates an example of the configuration of an image measuring apparatus according to a third embodiment of the invention.
Figure 6:
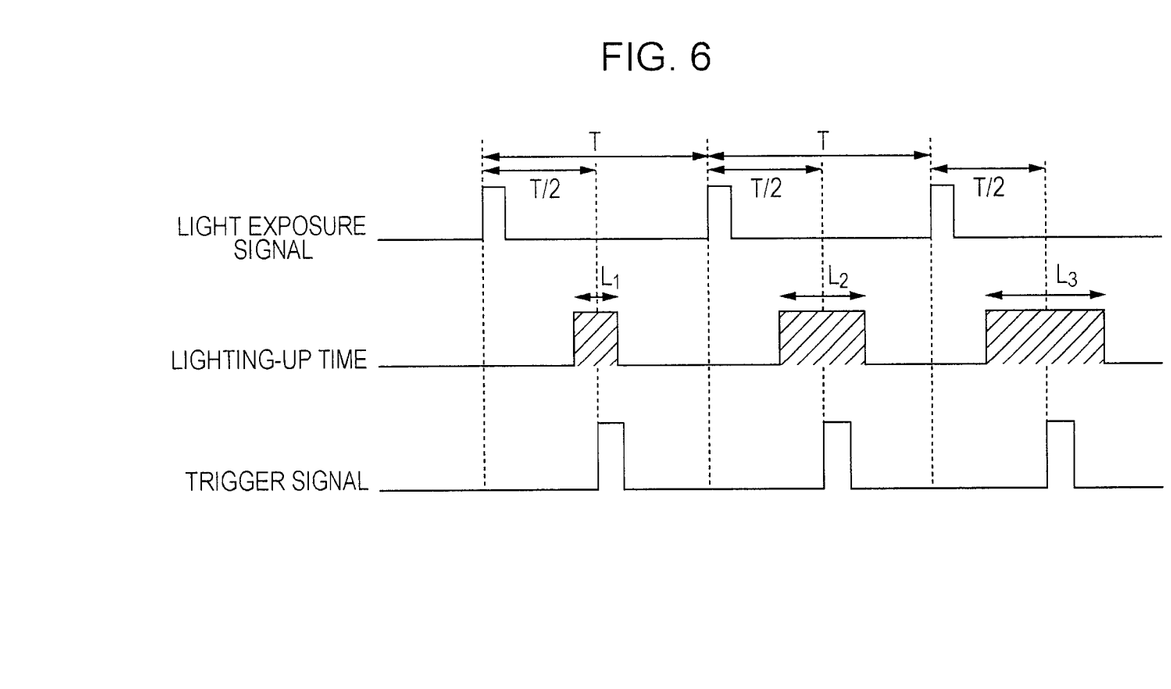
FIG. 6 is a diagram that shows the timing diagram of automatic focus processing performed by an image measuring apparatus according to the third embodiment of the invention.

With reference to the accompanying drawings, a third embodiment of the present invention will now be explained in detail. FIG. 5 is a block diagram that schematically illustrates an example of the configuration of an image measuring apparatus 1B according to the third embodiment of the invention. FIG. 6 is a diagram that shows the timing diagram of automatic focus processing performed by the image measuring apparatus 1B. As explained above, the image measuring apparatus 1A according to the second embodiment of the invention includes the relative position acquisition unit 42A.

The relative position acquisition unit 42A acquires the position of the camera 22 by receiving the exposure signal transmitted to the control unit 3. Thereafter, the relative position acquisition unit 42A compensates the position of the camera 22 on the basis of the exposure time T and the movement velocity in the position of the camera 22. As illustrated in FIG. 5, the image measuring apparatus 1B according to the third embodiment of the invention includes a relative position acquisition unit 42B. The image measuring apparatus 1B is different from the image measuring apparatus 1A in that, as illustrated in FIG. 6, the relative position acquisition unit 42B acquires the position of the camera 22 on the basis of the exposure signal transmitted to the control unit 3 and the exposure time T.

The present embodiment of the invention can demonstrate one or more of the same operating effects and can offer one or more of the same advantages as those described in (1) and (3) of the first embodiment of the invention. In addition, in some instances, one or more of the following operating effects and advantages can be expected.

(5) The relative position acquisition unit 42B can acquire the position of the camera 22 at the center of the lighting time $L_1$, $L_2$, and $L_3$ without performing compensation. Therefore, the image measuring apparatus 1B can detect a focus position properly by performing automatic focus processing.

Fourth Embodiment

Figure 7:
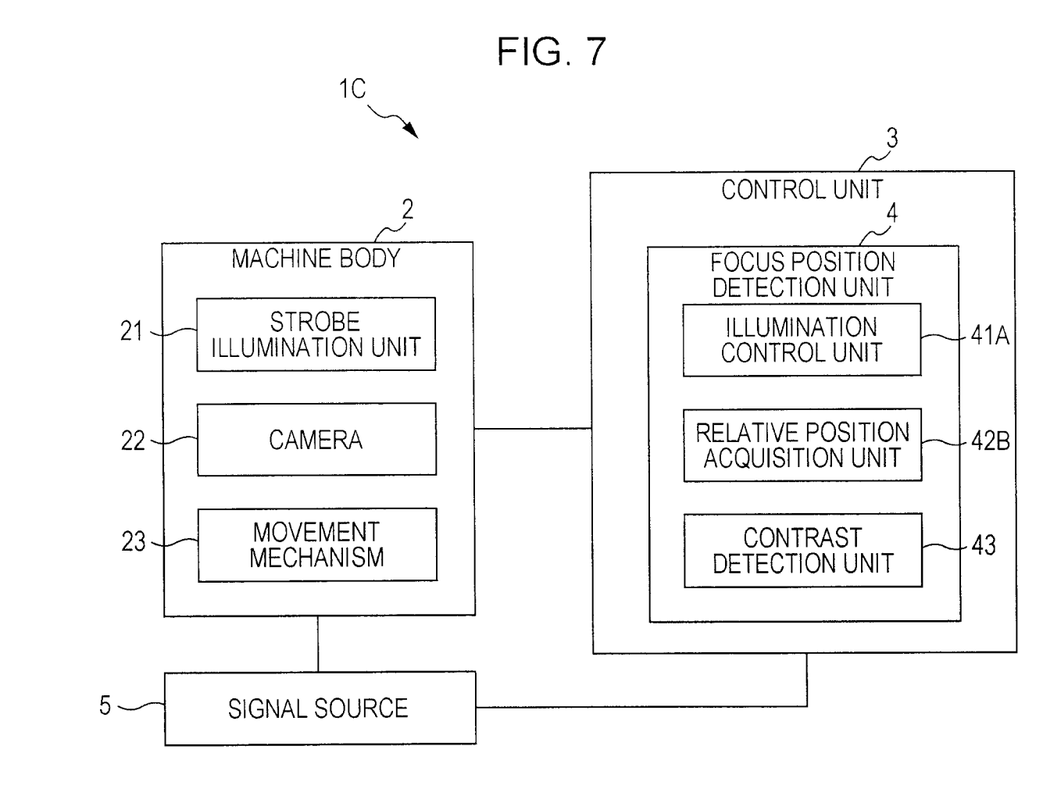
FIG. 7 is a block diagram that schematically illustrates an example of the configuration of an image measuring apparatus according to a fourth embodiment of the invention.
Figure 8:
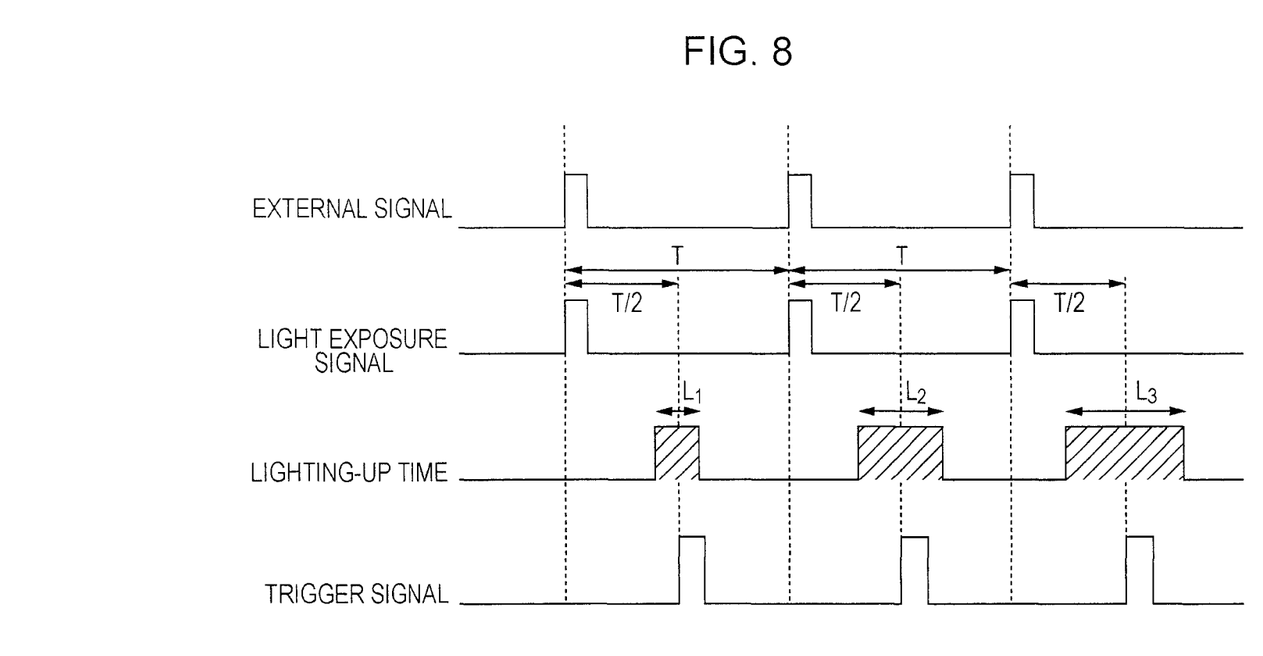
FIG. 8 is a diagram that shows the timing diagram of automatic focus processing performed by an image measuring apparatus according to the fourth embodiment of the invention.

With reference to the accompanying drawings, a fourth embodiment of the present invention will now be explained in detail. FIG. 7 is a block diagram that schematically illustrates an example of the configuration of an image measuring apparatus 1C according to the fourth embodiment of the invention. FIG. 8 is a diagram that shows the timing diagram of automatic focus processing performed by the image measuring apparatus 1C. As explained above, the image measuring apparatus 1B according to the third embodiment of the invention performs automatic focus processing on the basis of the exposure signal transmitted to the control unit 3. The image measuring apparatus 1C according to the fourth embodiment of the invention includes, as illustrated in FIG. 7, a signal source 5 that is connected to the machine body 2 and the control unit 3 of the image measuring apparatus 1C. The image measuring apparatus 1C is different from the image measuring apparatus 1B in that, as illustrated in FIG. 8, automatic focus processing is performed on the basis of an external signal that is transmitted from the signal source 5.

The present embodiment of the invention can demonstrate one or more of the same operating effects and can offer one or more of the same advantages as those described in (1) of the first embodiment of the invention and (5) of the third embodiment of the invention. In addition, in some instances, one or more of the following operating effects and advantages can be expected.

(6) The relative position acquisition unit 42B can acquire the position of the camera 22 at the center of the lighting time $L_1$, $L_2$, and $L_3$ by utilizing the external signal that is transmitted from the signal source 5. Therefore, the image measuring apparatus 1C can detect a focus position properly by performing automatic focus processing.

Variation Examples of Foregoing Embodiments

The scope of the invention is not limited to the foregoing embodiments. Various modifications, improvements, and the like that are made within a range in which an object of the invention is achieved are encompassed therein. In each of the foregoing embodiments of the invention, it is explained that the movement mechanism 23 moves the camera 22 to position the camera 22 and the measurement target object W relative to each other. In addition, each of the relative position acquisition units 42, 42A, and 42B determines the relative positions of the camera 22 and the measurement target object W by acquiring the position of the camera 22. However, the scope of the invention is not limited to such exemplary configurations. For example, a movement mechanism may move a measurement target object to position an image pickup unit and the measurement target object relative to each other. In addition, a relative position acquiring section may acquire the relative positions of the image pickup unit and the measurement target object by acquiring the position of the measurement target object. Alternatively, a movement mechanism may move both an image pickup unit and a measurement target object to position the image pickup unit and the measurement target object relative to each other. In addition, a relative position acquiring section may acquire both the position of the image pickup unit and the position of the measurement target object, thereby acquiring the relative positions of the image pickup unit and the measurement target object.

As described above, the invention can be applied to an image measuring apparatus. In particular, the invention can be suitably applied to an image measuring apparatus that is equipped with a strobe illumination unit.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "contain," "includes," and "involves" are used in either the detailed description or the claims, such terms are intended to be inclusive in a manner similar to the term "comprising" as "comprising" is interpreted when employed as a transitional word in a claim.

What is claimed is:

1. An image measuring apparatus comprising:
   a strobe illumination unit that illuminates a measurement target object with light;
   an image pickup unit that picks up an image of the measurement target object;
   a movement mechanism that moves the image pickup unit, the measurement target object, or combinations thereof relative to each other; and
   a control unit that controls the strobe illumination unit, the image pickup unit, and the movement mechanism to measure the measurement target object on the basis of the image picked up by the image pickup unit, the control unit comprising:
      a focus position detector that detects a focus position of the image pickup unit by controlling the movement mechanism to change a positional relationship between the image pickup unit and the measurement target object along an optical axis of the image pickup unit at a predetermined movement velocity and by controlling the image pickup unit to pick up the image of the measurement target object at a plurality of relative positions, the focus position detector comprising:
         an illumination controlling section that controls brightness of illumination used for picking up the image of the measurement target object at the image pickup unit by controlling a time period of lighting the strobe illumination unit;

a relative position acquiring section that acquires each of the relative positions at the center of the time period of the lighting; and a contrast detecting section that detects contrast of the image picked up by the image pickup unit, wherein, among the relative positions acquired by the relative position acquiring section, the focus position detector selectively detects one relative position that corresponds to an image that maximizes the contrast detected by the contrast detecting section as the focus position.

2. The image measuring apparatus according to claim 1, wherein the illumination controlling section starts lighting of the strobe illumination unit by receiving a predetermined signal transmitted to the control unit; and the relative position acquiring section acquires each of the relative positions by receiving the predetermined signal and thereafter compensates the relative position on the basis of the time period of the lighting and the predetermined movement velocity.

3. The image measuring apparatus according to claim 1, wherein, on the basis of a predetermined signal transmitted to the control unit and exposure time of the image pickup unit, the illumination controlling section controls the time period of the lighting in such a manner that the center of the time period of the lighting is the same point in time as the center of the exposure time; and the relative position acquiring section acquires each of the relative positions by receiving the predetermined signal and thereafter compensates the relative position on the basis of the exposure time and the predetermined movement velocity.

4. The image measuring apparatus according to claim 1, wherein, on the basis of a predetermined signal transmitted to the control unit and exposure time of the image pickup unit, the illumination controlling section controls the time period of the lighting in such a manner that the center of the time period of the lighting is the same point in time as the center of the exposure time; and the relative position acquiring section acquires each of the relative positions on the basis of the predetermined signal and the exposure time.

5. The image measuring apparatus according to claim 2, wherein the predetermined signal is an exposure signal that is transmitted from the image pickup unit to the control unit when the image pickup unit starts to pick up the image of the measurement target object.

6. The image measuring apparatus according to claim 3, wherein the predetermined signal is an exposure signal that is transmitted from the image pickup unit to the control unit when the image pickup unit starts to pick up the image of the measurement target object.

7. The image measuring apparatus according to claim 4, wherein the predetermined signal is an exposure signal that is transmitted from the image pickup unit to the control unit when the image pickup unit starts to pick up the image of the measurement target object.

8. The image measuring apparatus according to claim 2, wherein the predetermined signal is an external signal that is transmitted from a signal source to the control unit; and the signal source is connected to the image measuring apparatus.

9. The image measuring apparatus according to claim 3, wherein the predetermined signal is an external signal that is transmitted from a signal source to the control unit; and the signal source is connected to the image measuring apparatus.

10. The image measuring apparatus according to claim 4, wherein the predetermined signal is an external signal that is transmitted from a signal source to the control unit; and the signal source is connected to the image measuring apparatus.

* * * * *